Sept. 27, 1960  R. D. PECK  2,953,871
FRAME FOR FORMING BENT OR CURVED
GLASS OR OTHER MATERIAL
Filed Oct. 1, 1957  2 Sheets-Sheet 2
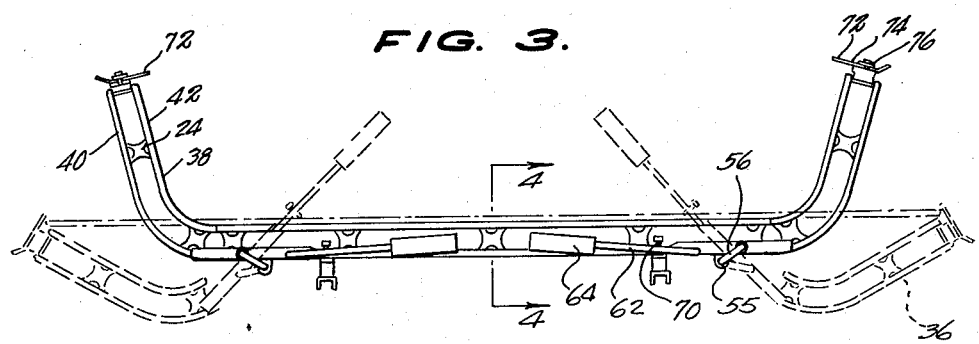
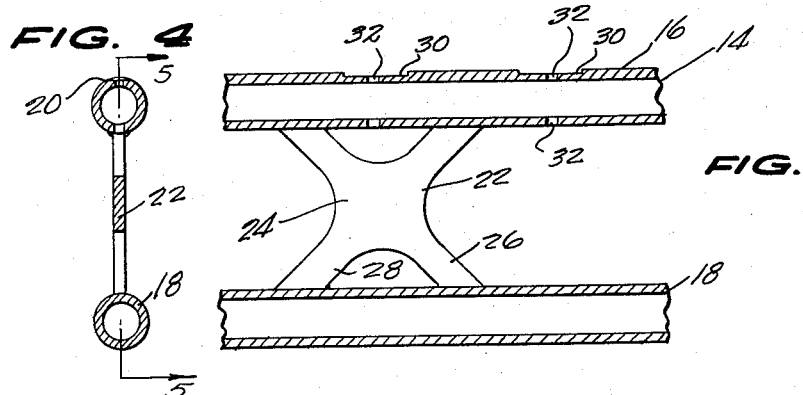
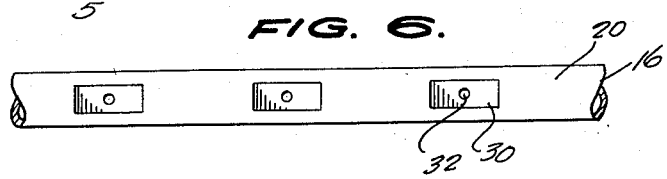
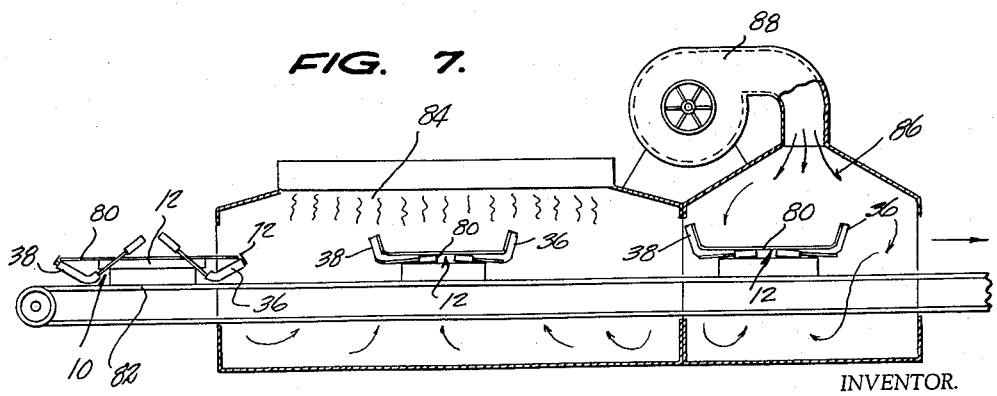
INVENTOR.
ROBERT D. PECK,
BY
McMorrow, Berman + Davidson
ATTORNEYS.

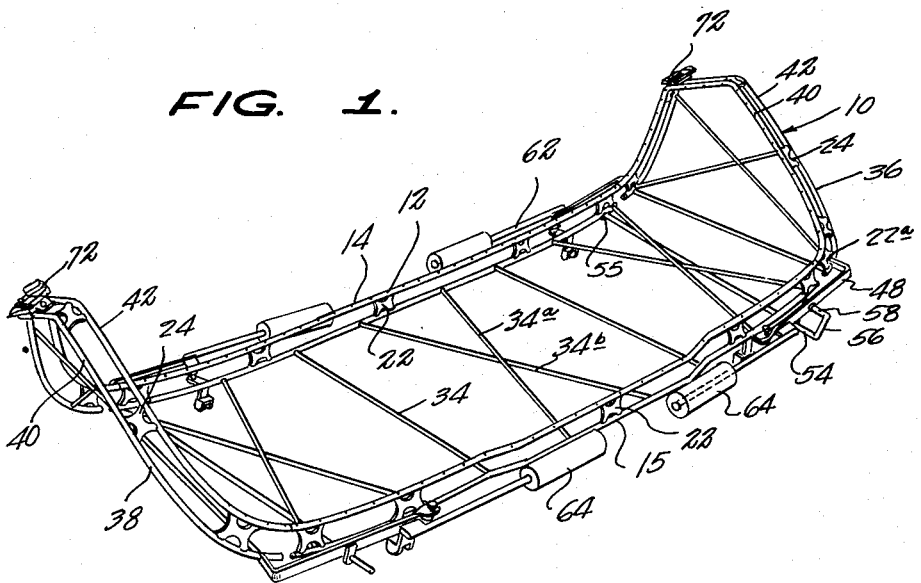

United States Patent Office 2,953,871
Patented Sept. 27, 1960

2,953,871

FRAME FOR FORMING BENT OR CURVED GLASS OR OTHER MATERIAL

Robert D. Peck, 1339 Fifth Ave., Ford City, Pa.

Filed Oct. 1, 1957, Ser. No. 687,461

2 Claims. (Cl. 49—67)

The present invention generally relates to the production of bent or curved materials, which require a heating cycle in the bending process, and particularly relates to the production of bent and annealed plate glass shapes, such as are used in the automobile industry.

In the present manufacture of bent and annealed plate glass for the automobile industry, strip and bar stock of stainless steel are used for the manufacture of molds that are used in the bending and annealing process. Such materials and their assembly necessitate difficult, time consuming, and inexact manual forming operations which considerably increase the cost of each fabricated mold. Furthermore, the plate glass, as it is processed in present molds, is susceptible to breakage owing to thermal and mechanical stresses suffered by the mold-glass combination during the annealing cycle.

The primary object of the present invention is to provide a new and improved mold, whereby more uniform heating and cooling of the glass in contact with the mold may be promoted. Such uniform heating is made possible because of the fact that the proposed mold is low in total mass of material in relation to the glass for bending. This results in overall uniformity of temperature during the annealing cycle and consequent diminishment of thermal stresses capable of producing fractures in the glass.

A further important object of the present invention is to provide a mold that is formed so as to prevent less surface area in contact with the glass and less of an obstruction to the flow of forced air used in the air quenching of the bent glass as it emerges from the heating furnace. This results in greater uniformity of heating and cooling of the total glass plate which has the advantage of less breakage of the glass plate.

A further important object of the present invention is to provide a mold which will enable a uniform temperature to be created in the glass plate as it rests on the mold during the annealing cycle. This is accomplished by forming the mold of a frame, which is hollow or tubular and which, therefore, possesses heating and cooling characteristics that are extremely favorable to the creation of a uniform temperature in the glass plate.

A further important object of the present invention is to provide a glass mold which has a free bearing surface on which the glass rests, such surface being curved, due to the tubular cross-sectional configuration of the mold, so that no penetration of the glass surface by the mold during the annealing process is possible. Because of the complete lack of any penetrations of the glass by the mold, the glass plate will be stronger and no focal points, which would produce a fracture, are formed.

A still further important object of the present invention is to provide a mold which is easy to handle and is light in weight and which is considerably rigid and resistant to damage.

Another important object of the present invention is to provide a mold, which includes a rigid center section and hinged or pivoted end sections, that are adapted to support the glass plate in a flat position, as the mold enters the heating furnace and to provide weight means, which cause the end sections to move upwardly into their normal positions so as to bend the glass plate upwardly during the annealing cycle.

The foregoing and ancillary objects are attained by this invention, the preferred embodiment of which is set forth in the following description and illustrated in the accompanying drawings, wherein:

Figure 1 is a view in perspective of the mold of this invention;

Figure 2 is a fragmentary and perspective view thereof;

Figure 3 is a side elevational view thereof;

Figure 4 is a vertical cross-sectional view taken through one side of the center section of the frame;

Figure 5 is a vertical longitudinal sectional view taken on line 5—5 of Figure 4;

Figure 6 is a detail top plan view of one of the sides of the center section, and, Figure 7 is a diagrammatic view illustrating the heating furnace and the cooling chamber for carrying out the process of bending the glass and showing the mold of the present invention as it passes into the heating furnace and then into the cooling chamber.

Referring now more particularly to the accompanying drawings, and initially to Figures 1–6, the mold 10 is particularly provided for the production of bent and annealed plate glass shapes but it can be used with equal facility in the production of bent or curved shapes of other materials, such as thermo-setting plastics or the like, which require a heating cycle in the bending process.

The mold 10 includes a rigid center section 12, which is composed of opposing sides 14 and 15. Each of the sides is similarly constructed and, as shown in Figures 3–5, the side 14 includes upper and lower tubular bars 16 and 18. The bars 16 and 18 are circular in cross-section, as shown in Figure 4, but it is sufficient if the upper surface 20 of the upper bar is curved so as to provide a minimum contact with the plate glass or plate of other materials and that the bars 16 and 18 are hollow. However, it is preferred that the bars 16 and 18 be formed from circular or annular hollow rods, so that the bars are low in total mass of material and will create a uniform temperature in the glass plate while it rests on the mold during the annealing cycle.

The tubular rods 16 and 18 are interconnected in rigid relationship and spaced apart by vertically disposed spacers 22, which are formed from flat thin stock and which include a center section 24 and outwardly diverging ends 26 and 28 that are connected to the upper surface of the lower tubular bar or rod 18 and the under surface of the upper tubular rod or bar 16.

The upper surfaces 20 of the upper rods or bars 16 of both the side sections are formed with small transverse scored portions 30 and the rods 16 are provided, at the center of such scoring, with small openings 32 which extend through the undersurface of the upper rods or bars. The scores 30 can be approximately .020 inch long and spaced about every three quarter inches along the length of the rods. The holes 32 may be 5/32 of an inch and are, of course, drilled through the scored section through the upper and lower surfaces of the tube. By providing the scores and the small openings through the top tubes or rods 16 of the side sections of the frame at three quarter of one inch intervals, the cooling characteristics of the mold will be considerably aided.

The side sections 14 and 15 are spaced apart by transverse rods 34 which extend transversely between the lower tubes 18 of the side sections and which may be extended diagonally, in cross fashion, at spaced places, as shown by the rods 34a and 34b. The spacing rods 34, 34a and 34b space the side sections apart and provide the rigidity for forming the side sections into a rigid center mold section.

The center mold section 12 is provided at its opposing open ends with hinged end sections 36 and 38, each of which is identically constructed.

Thus, as shown particularly in Figure 2, the end section 36 is formed from upper and lower tubular rods or tubes 40 and 42, which are spaced vertically apart in the same spaced relationship as the tubes 16 and 18 by vertical spacers 24. The tubes 38 and 40 are in substantially U or somewhat V shape in that they have a closed end and opposing side portions 44 and 46, which are pivotally or hingedly attached to the sides 14 and 15 of the center section. Of course, the particular configuration or shape of the end sections 36 and 38 would be dependent upon the shape that is to be given to the end portions of the plate glass or plate of other material that is to be bent.

The upper or lower rods or tubes 40 and 42 of the end sections are spaced apart at their inner ends by flat thin webs 22a, which carry angular L-shaped supporting arms 48. The lateral portions 50 of the supporting arms are fixedly secured to the webs 22a and extend outwardly therefrom, so as to space the longitudinal portions 52 of the arms outwardly from the opposing side sections 14 and 15 of the center section 12. The arms 52 are pivotally attached to the end portions of the side sections 14 and 15 of the center section 12 by a rod 54. The rod 54 extends transversely beneath the lower tubular rods 18 of the side portions 14 and 15 and is rotatably disposed through apertured ears 55 which depend from the lower tubular rods 18 of the center section. The rod 54 projects laterally beyond the sides 14 and 15 and is formed with upstanding end portions 56, which terminate in inwardly directed stub portions 58 that parallel the rod 54 and are secured by locking nuts 60 to the longitudinal portion 52 of the arm 48, intermediate the ends thereof. By virtue of this construction, the end sections 36 and 38 are pivotally attached to the center section 12 for swinging movement upwardly and downwardly, relative to the center section.

Weight means is provided for normally retaining the end sections in the raised or elevated position, as shown in Figure 1. Such weight means include a rod 62, which carries a weight 64 at its outer end and which is fixed by a plate 66 or other suitable means to the longitudinal portion 52 of each of the arms 48, inwardly of the pivot or axis of the rod 54.

Stop means is provided for locating the end sections in a raised or elevated position. Such means includes a laterally outstanding ear 68 on each of the sides 14 and 15 of the center section for each of the end sections 36 and 38. The outer end of the longitudinal portion 52 of the arm 48 is threaded to receive a set screw 70, which bears on the upper surface of the ear 68. The set screw 70 is adjustable so that the extreme upward movement of the end sections can be adjusted within certain limits.

It is obvious that because of the fact that the weight 64 extends inwardly beyond the axis of the end sections 36 and 38 that the weight will tend to urge and normally retain the end sections in raised positions, the extent of such upward movement being limited by the stop means 68 and 70.

Each of the end sections is formed with an adjustable stop 72, which locates the plate of glass or similar material on the mold, as will be explained. The stops 72 include a small bar 74, which is slidably disposed within the bracket means 76 positioned on the ends of the end sections 36 and 38. As shown in Figure 2, the bracket means 76 may include a strap, which extends transversely across the bars and which is provided with screws 78 to fasten it on to the end sections so as to tightly hold the stop 72 at any desired height relative to the ends of the end sections 36 and 38.

In use, as shown in Figure 7, the glass plate 80 or plate of similar material, which can be bent or curved by a heating or annealing process, is laid flat on the center section 12. The ends of the plate rest on the end sections 36 and 38 and the weight of the plate offsets the weight of the weight 64 so that the end sections are in their lowered positions, thereby accommodating the plate in a flat position, resting in a horizontal plane. The plate is located in position by positioning its ends against the stops 72 on the end sections 36 and 38. As the mold is carried by a conveyor means 82 through the furnace 84, the plate glass bends from the heat in the furnace and the weights cause the end sections 36 and 38 to move upwardly so as to form the ends of the plate glass into the desired curvature. The mold with the formed plate then passes through the air chamber 86, where forced air from a blower means 88 passes over the plate.

It is to be particularly noted that because of the formation of the mold, due to the tubular form of the upper and lower members 16 and 18 and the provision and arrangement of the cross bracing rods 34, 34a and 34b, that uniform heating of the plate is made possible, since the mold is exceedingly low in total mass of material when combined with the glass plate 80. Therefore, there is an overall uniformity of temperature imposed on the glass plate during the annealing cycle and a consequent reduction of thermal stresses, which are capable of producing fractures in the glass. In addition, it is to be noted that the mold presents a very small surface area in contact with the glass plate and, therefore, affords very little obstruction to the flow of forced air used in the air quenching of the bent glass as it emerges from the heating furnace 84 and is carried into the cooling chamber 86. This results in a greater uniformity of heating and cooling of the total glass plate which results in less breakage of the plate.

Having thus described this invention what is claimed is:

1. A mold for the producton of bent and annealed plates which are passed in flat form through adjoining heating and cooling chambers comprising a rigid center section including opposing sides, said sides being comprised of hollow rods interconnected and held in spaced relation by transverse brace rods, each of said sides having upper and lower hollow rods, the upper rods having upper rounded surfaces on which the flat plate is placed and the brace rods being connected to the lower rods and thin webbing joining the upper and lower rods at spaced apart points, and said upper surfaces being scored at evenly spaced points of approximately less than one inch apart.

2. A mold for the production of bent and annealed plates which are passed in flat form through adjoining heating and cooling chambers comprising a rigid center section including opposing sides, said sides being comprised of hollow rods interconnected and held in spaced relation by transverse brace rods, each of said sides having upper and lower hollow rods, the upper rods having upper rounded surfaces on which the flat plate is placed and the brace rods being connected to the lower rods and thin webbing joining the upper and lower rods at spaced apart points, and said upper surfaces being scored at spaced points, and said upper rods having vertical holes formed therethrough and passing through the scoring.

References Cited in the file of this patent

UNITED STATES PATENTS

| | | |
|---|---|---|
| 2,003,383 | Miller | June 4, 1935 |
| 2,297,315 | Owen | Sept. 29, 1942 |
| 2,330,349 | Galey | Sept. 28, 1943 |
| 2,348,279 | Boyles et al. | May 9, 1944 |
| 2,758,422 | Jendrisak | Aug. 14, 1956 |

FOREIGN PATENTS

| | | |
|---|---|---|
| 1,085,942 | France | Aug. 4, 1954 |
| 1,089,973 | France | Oct. 13, 1954 |
| 747,070 | Great Britain | Mar. 28, 1956 |